L. WENZEL, Jr.
PUNCTURE PROOF PNEUMATIC TIRE.
APPLICATION FILED JULY 12, 1917.
1,263,176. Patented Apr. 16, 1918.
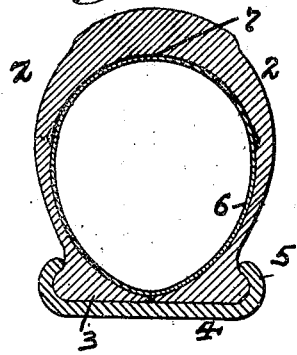
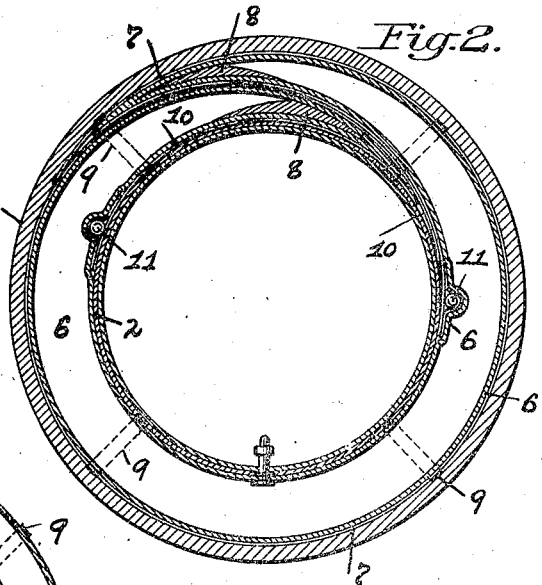
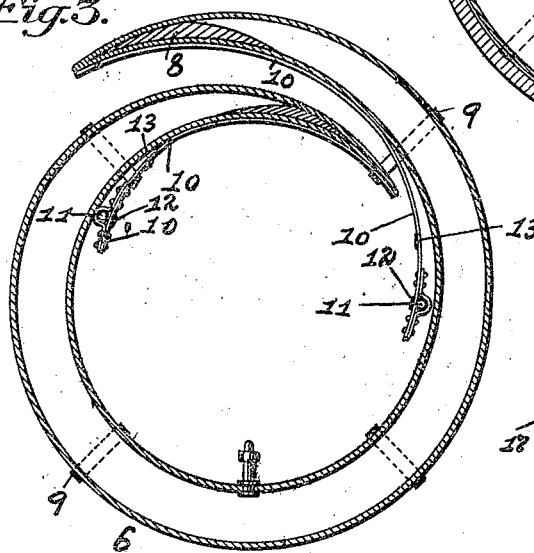

UNITED STATES PATENT OFFICE.

LOUIS WENZEL, JR., OF PITTSBURGH, PENNSYLVANIA.

PUNCTURE-PROOF PNEUMATIC TIRE.

1,263,176.

Specification of Letters Patent.  Patented Apr. 16, 1918.

Application filed July 12, 1917. Serial No. 180,079.

*To all whom it may concern:*

Be it known that I, LOUIS WENZEL, Jr., a citizen of the United States, and a resident of Pittsburgh, North Side, in the county of Allegheny and State of Pennsylvania, have invented a new and useful Improvement in Puncture-Proof Pneumatic Tires; and I do hereby declare the following to be a full, clear, and exact description thereof.

My invention relates to puncture proof pneumatic tires, and more particularly to internally armored pneumatic tires. Heretofore so-called puncture proof tires have been either so heavy and clumsy as to make them impracticable or have not been puncture proof. It is one of the objects of my invention to produce a device that would utilize an ordinary casing or shoe having a peculiar and novel form of inner tube therein. The size, shape and weight of the tire being substantially the same as the tires now in use.

Another object of my invention is to provide means for preventing the inner tube slipping or traveling within the casing as is now a common occurrence, and which often results in tearing the valve from the inner tube, thereby rendering the inner tube useless.

One of the main objections to the puncture proof tires and wheels heretofore produced is that the tires were either permanently secured on the rim of the wheel, or were so constructed as to be inaccessible for the purpose of making repairs without dismounting the wheel and disassembling the tire. My invention overcomes this objection in that it is as readily dismantled as the ordinary tire or inner tube now in use.

One preferred form of my invention is described in the following specification and illustrated in the accompanying drawings, in which:—

Figure 1 is a cross section of a tire constructed according to my invention;

Fig. 2 is a longitudinal sectional view of the same;

Fig. 3 is a longitudinal sectional view of the inner tube and its assembled parts;

Fig. 4 is a longitudinal sectional view of a tube in its flattened form;

Fig. 5 is a perspective view of the armor; and

Fig. 6 is a cross sectional view on the line 6—6 of Fig. 5.

Referring more particularly to the drawings the numeral 2 designates the casing of an ordinary tire having the usual clencher terminals 3 adapted to be engaged under the flanges 5 of the clencher rim 4.

My improvement consists in a novel form of inner tube 6 and resilient protecting and reinforcing spring metallic member 7 and accompanying parts. The inner tube 6 has overlapping solid ends 8 tapering forwardly, and is held to the resilient member 7 by elastic bands 9. The inner surface or under side of the inner tube 6 has secured thereto fabric members 10 which extend inwardly from the free ends of the inner tube 6 an appreciable distance. Adjacent the free ends of the fabric members and permanently secured thereon are ball-shaped gripping members 11 of rubber or other suitable material. On the underside of the fabric members and directly beneath the ball-shaped gripping members 11 are disks 12 of anti-slipping material, preferably alundum. Between the disks 12 and the ends of the inner tube are other disks 13 similar in shape and size and of the same material as the disks 12.

The ball-shaped gripping members 11 and the disks 12 and 13 are adapted to hold the inner tube 6 in positive position within the casing or shoe 2. When the inner tube is inflated with air the gripping members 11 will anchor themselves in the tube 6, and the disks 12 and 13 will be pressed against the bottom surface of the casing 2 and positively engage the same, owing to the anti-slipping face of the alundum on the disks.

The resilient spring member 7 is curved in cross section to form a concave portion to receive the inner tube 6, and has its ends rounded as at 14. A flexible cushion and cover member 15 surrounds the member 7. Secured to the longitudinal edges of the member 7 is a member 16 of leather or other flexible material adapted to form a pocket or longitudinal recess. Within the recess or pocket are secured strands of cable or other round bearing members 17 adapted to receive the thrust of the edges of the member 7 and cushion said member so as to prevent cutting or wearing of either the casing 2 of the inner tube 6. The members are preferably packed in dry graphite, or other lubricating material, to prevent the generation of heat due to any friction.

The operation and construction of my device will be readily understood from the above description, it being kept in mind that the inner tube 6, spring member 7 and the gripping members 11, 12 and 13 all go to make up an integral unit or filler to be placed within an ordinary shoe or casing.

I wish to also expressly bring out the particular function of the gripping balls 11 and gripping disks 12 and 13, which serve to prevent the inner tube from slipping within the shoe 2 and tearing the valve from the casing, as is not an uncommon occurrence with inner tubes at present in use.

While I have shown and described one preferred form of my invention, it will be readily seen that various changes in design and minor details of construction may be made within the skill of an ordinary mechanic in the art without departing from the spirit of my invention; and I wish it to be understood that such changes are to be construed as within the scope of the appended claims:

Having thus fully described my invention, what I claim is:

1. In combination with a pneumatic tire casing, an inner-tube comprising a tubular air cushion portion, and means secured on the under face of said tube adapted to grip said cushion and said casing to hold it in position within said casing.

2. An inner-tube for pneumatic tires comprising a tubular air cushion portion and flexible fabric members secured to the under face of said air cushion portion, said fabric members having a plurality of gripping lugs thereon adapted to anchor said tube in position.

3. An inner tube for pneumatic tires comprising a tubular air cushion portion, flexible fabric strips secured to the inner face of said air cushion portion, and projections on said strips adapted to hold said tube in positive position within the tire.

4. In combination with a pneumatic tire casing, an inner tube comprising a tubular air cushion portion, flexible fabric strips secured by their one end to the under face of said air cushion portion, and projections on said strips adapted to engage said tube to hold it in positive position within said casing.

5. In combination with a pneumatic tire casing, an inner tube comprising a tubular air cushion portion, and gripping members carried by said cushion portion adapted to anchor in the same and to grip said casing to hold said inner tube in position.

In testimony whereof, I, the said Louis Wenzel, Jr., have hereunto set my hand.

LOUIS WENZEL, Jr.

Witnesses:
   J. M. Geoghegan,
   J. N. Cooke.